US009582653B2

(12) United States Patent
Franke et al.

(10) Patent No.: US 9,582,653 B2
(45) Date of Patent: Feb. 28, 2017

(54) GRAPHICAL USER PASSWORDS (71) Applicant: International Business Machines Corporation, Armonk, NY (US)

(72) Inventors: Hubertus Franke, Cortlandt Manor, NY (US); Anshu Narendra Jain, Sunnyvale, CA (US); Davide Pasetto, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/505,147

(22) Filed: Oct. 2, 2014

(65) Prior Publication Data
US 2016/0098553 A1 Apr. 7, 2016

(51) Int. Cl.
*G06F 21/36* (2013.01)

(52) U.S. Cl.
CPC .................... *G06F 21/36* (2013.01)

(58) Field of Classification Search
CPC ......... G06F 3/041; G06F 21/36; H04L 63/10; H04L 63/0428; H04L 63/08
USPC ...................................... 726/18, 19
See application file for complete search history.

(56) References Cited

U.S. PATENT DOCUMENTS

| | | | | |
|---|---|---|---|---|
| 2012/0304284 | A1* | 11/2012 | Johnson | H04L 9/3226 726/19 |
| 2013/0229367 | A1 | 9/2013 | Pinch | |
| 2014/0181956 | A1* | 6/2014 | Ahn | G06F 21/46 726/18 |
| 2014/0317724 | A1* | 10/2014 | Hicks | G06F 21/36 726/19 |
| 2014/0359653 | A1* | 12/2014 | Thorpe | G06F 21/00 725/30 |

OTHER PUBLICATIONS

Biddle et al., Graphical passwords: Learning from the first twelve years, ACM Computing Surveys (CSUR), vol. 44 Issue 4, Aug. 2012.
Aviv et al., Smudge attacks on smartphone touch screens, WOOT'10 Proceedings of the 4th USENIX conference on Offensive technologies Article No. 1-7, 2010.
Gao et al., A New Graphical Password Scheme Resistant to Shoulder-Surfing, Proceedings of 2010 International Conference on Cyberworlds IEEE Computer Society, 2010.
Sinofsky, Optimizing picture password security, MSDN Blogs, Dec. 19, 2011.
Guo et al., Authentication using graphical password in cloud, Wireless Personal Multimedia Communications (WPMC), 2012 15th International Symposium, Sep. 24-27, 2012.

(Continued)

*Primary Examiner* — Hadi Armouche
*Assistant Examiner* — Hee Song
(74) *Attorney, Agent, or Firm* — Derek S. Jennings; Patent Mining Works, LLC (57) ABSTRACT

A method includes a computer device receiving a set of images for at least one user; the computer device receiving unique visual clue inputs from the at least one user for each image of the set of images; the computer device receiving drawing gesture inputs from the at least one user for each image of the set of images; and the computer device using the visual clue and drawing gesture inputs to create passwords to provide a locked access point for at least one device.

17 Claims, 5 Drawing Sheets

(56) References Cited

OTHER PUBLICATIONS

Jakobasson et al., Authentication-Are We Doing Well Enough?, IEEE Computer Society pp. 19-21, Jan./Feb. (2012 vol. 1 0).
Schaub et al., Exploring the Design Space of Graphical Passwords on Smartphones, Symposium on Usable Privacy and Security (SOUPS) 2013, Jul. 24-26, 2013, Newcastle, UK.
Eljetla WI, Study and Develop a New Graphical Password System, Faculty of Computer Science and Information System Universiti Teknologi Malaysia, Nov 2008.

* cited by examiner

GRAPHICAL USER PASSWORDS

BACKGROUND

The present invention relates to graphical user passwords for user devices, and more specifically, to graphical user passwords using an ordered sequence to provide a locked access point to prevent unauthorized personnel from using certain user devices or gaining access to secured areas.

Starting around 1999, a great many graphical password schemes have been proposed as alternatives to text-based password authentication. These have become commercially available and widespread initially on smartphones and tablets, and later on in general purpose computers.

These existing graphical password systems employed on smartphones and touchscreen work by presenting the user with a previously selected image and asking him to draw a previously recorded gesture over it, using the image as a reference point. For example, android based phones uses a 3×3 dot array image and the user traces a path as set by a predetermined password to unlock the phone. Windows based phones uses drawn gestures on an image to unlock the phone.

While existing graphical password systems, such as described above, provide security to the phones they are prone to smudge attacks. The constant reuse of the same password by a user will leave a trace of the password on the screen. This trace could be used by anyone to unlock the phone.

SUMMARY

According to one aspect of the present invention, a method includes a computer device receiving a set of images for at least one user; the computer device receiving unique visual clue inputs from the at least one user for each image of the set of images; the computer device receiving drawing gesture inputs from the at least one user for each image of the set of images; and the computer device using the visual clue and drawing gesture inputs to create passwords to provide a locked access point for at least one device.

According to another aspect of the present invention, a system includes one or more processors, one or more computer-readable memories and one or more computer-readable, tangible storage devices; a receiving module operatively coupled to at least one of the one or more storage devices for execution by at least one of the one or more processors via at least one of the one or more memories, configured to receive a set of images for at least one user; a receiving module operatively coupled to at least one of the one or more storage devices for execution by at least one of the one or more processors via at least one of the one or more memories, configured to receive unique visual clue inputs from the at least one user for each image of the set of images; the receiving module operatively coupled to at least one of the one or more storage devices for execution by at least one of the one or more processors via at least one of the one or more memories, configured to receive drawing gesture inputs from the at least one user for each image of the set of images; and a security module operatively coupled to at least one of the one or more storage devices for execution by at least one of the one or more processors via at least one of the one or more memories, configured to use the visual clue and drawing gesture inputs to create passwords to provide a locked access point for at least one device.

According to yet another aspect of the present invention, a computer product includes: one or more computer-readable, tangible storage medium; program instructions, stored on at least one of the one or more storage medium, to receive a set of images for at least one user; program instructions, stored on at least one of the one or more storage medium, to receive unique visual clue inputs from the at least one user for each image of the set of images; program instructions, stored on at least one of the one or more storage medium, to receive drawing gesture inputs from the at least one user for each image of the set of images; and program instructions, stored on at least one of the one or more storage medium, to use the visual clue and drawing gesture inputs to create passwords to provide a locked access point for at least one device.

DETAILED DESCRIPTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. As will be appreciated by one skilled in the art, aspects of the present invention may be embodied as a system, method or computer program product.

Figure 1:
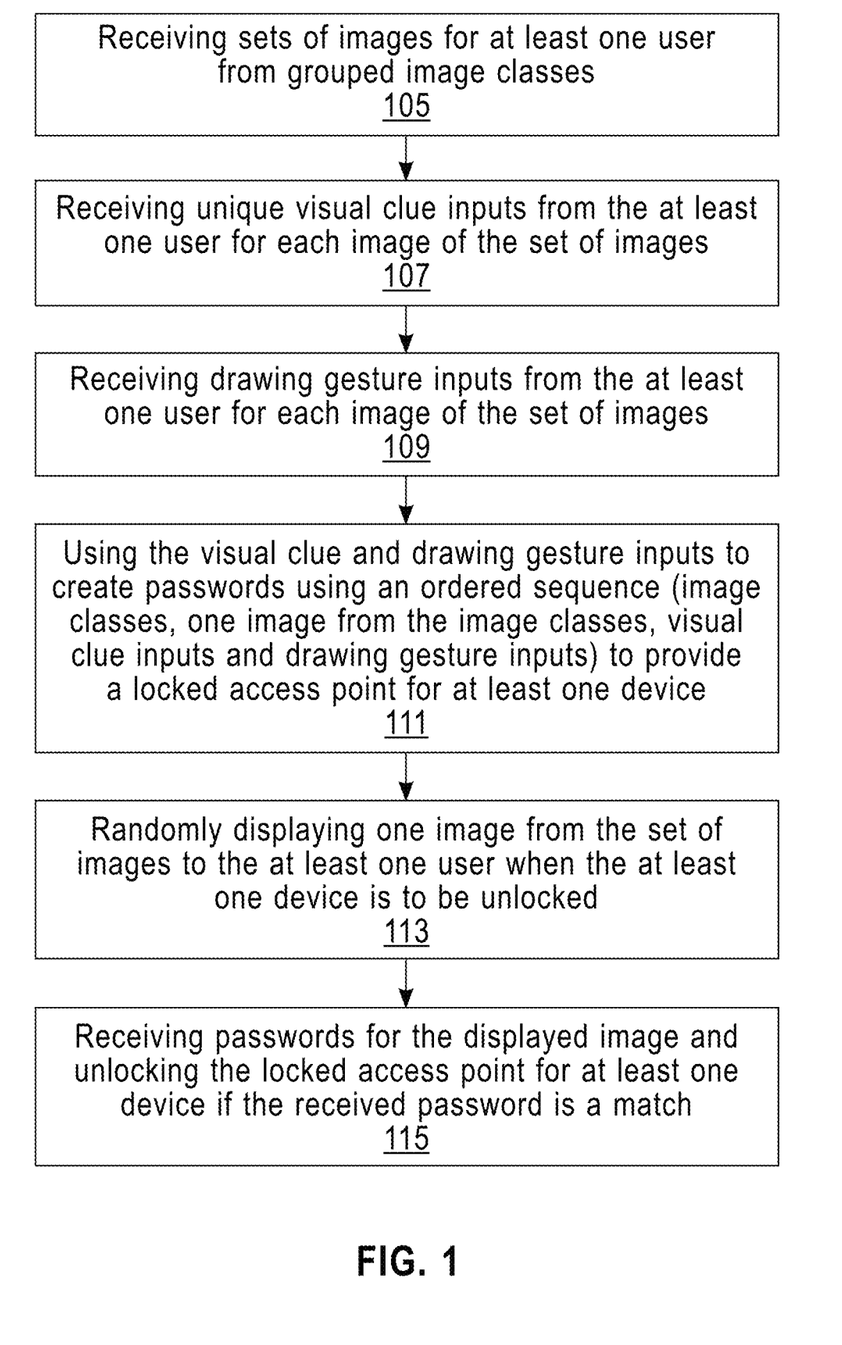
FIG. 1 shows a flowchart according to an embodiment of the present invention.

Now referring to FIG. 1, shown is a process according to an embodiment of the present invention. The process starts by receiving sets of images for users from grouped image classes (105). The images may be provided by either the users or system supplied. The process continues with receiving unique visual clues from the users for each image of the set of images (107) and drawing gesture inputs from the users for each image of the set of images (109). The drawing gestures path follows the user inputted visual clues. Once the visual clues and drawing gesture inputs are received, the process creates passwords using an ordered sequence (image classes, one image from the image classes, visual clue inputs and drawing gesture inputs) to provide a locked access point for at least one device (111). A password is tied to each image of the set of images. Once the passwords are set, user devices can be locked to prevent others from unauthorized use or access. As will be explained hereafter, locked access applies to other uses to prevent unauthorized access.

Still referring to FIG. 1, the process continues by randomly displaying one image from the set of images to users when devices are to be unlocked (113). Users are prompted to input a password by the displaying of the password image. If the inputted password is correct, the locked access point unlocks the user device (115). The process changes the displayed image every time the user wishes to unlock the user devices, thus providing different trace marks on a touch screen of a user device. This prevents others from determining the password to unlock the user's touch screen device. As will be explained hereafter, the passwords are unique for each image within the set of images by using the user supplied visual clues and gesture inputs.

Figure 2A:
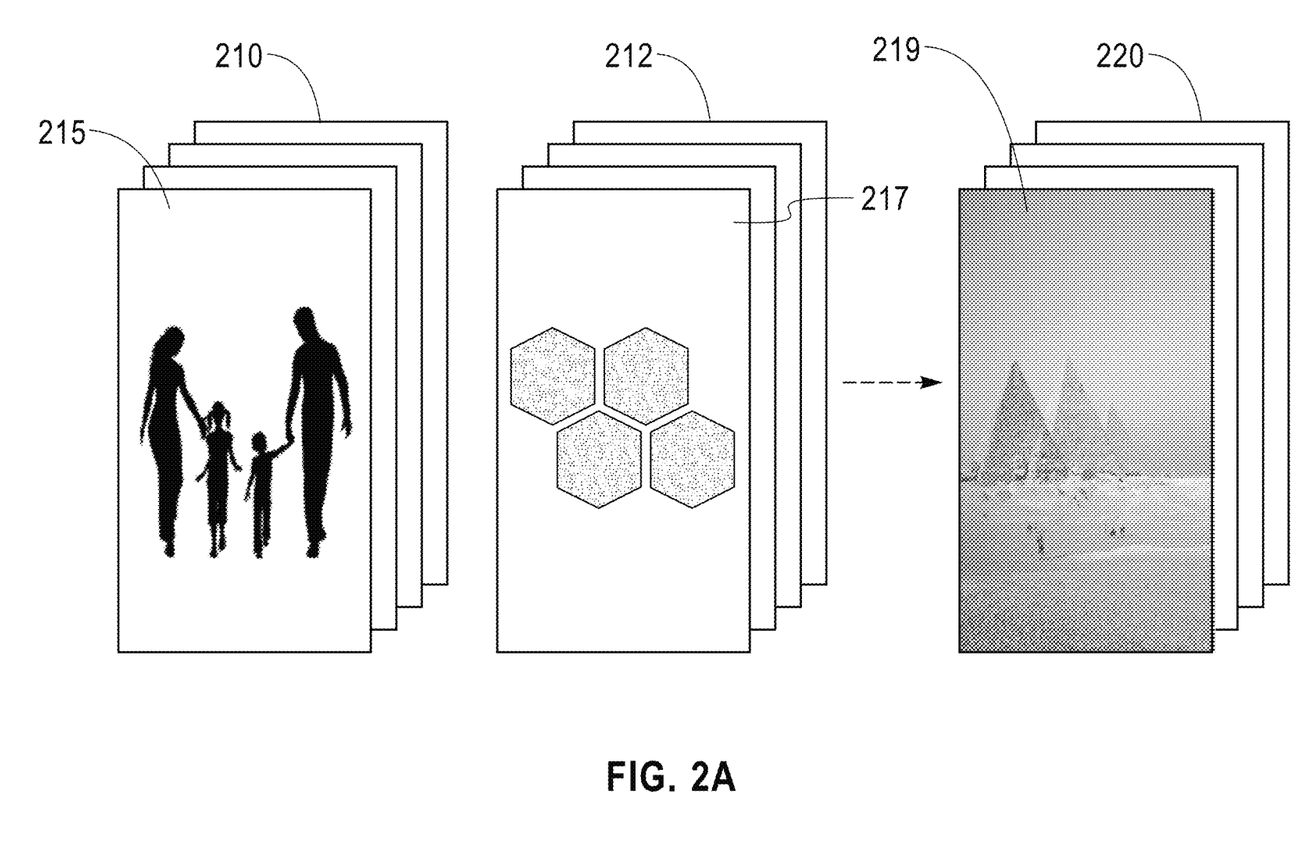
FIGS. 2A and 2B show an exemplary implementations according to an embodiment of the present invention.
Figure 2B:
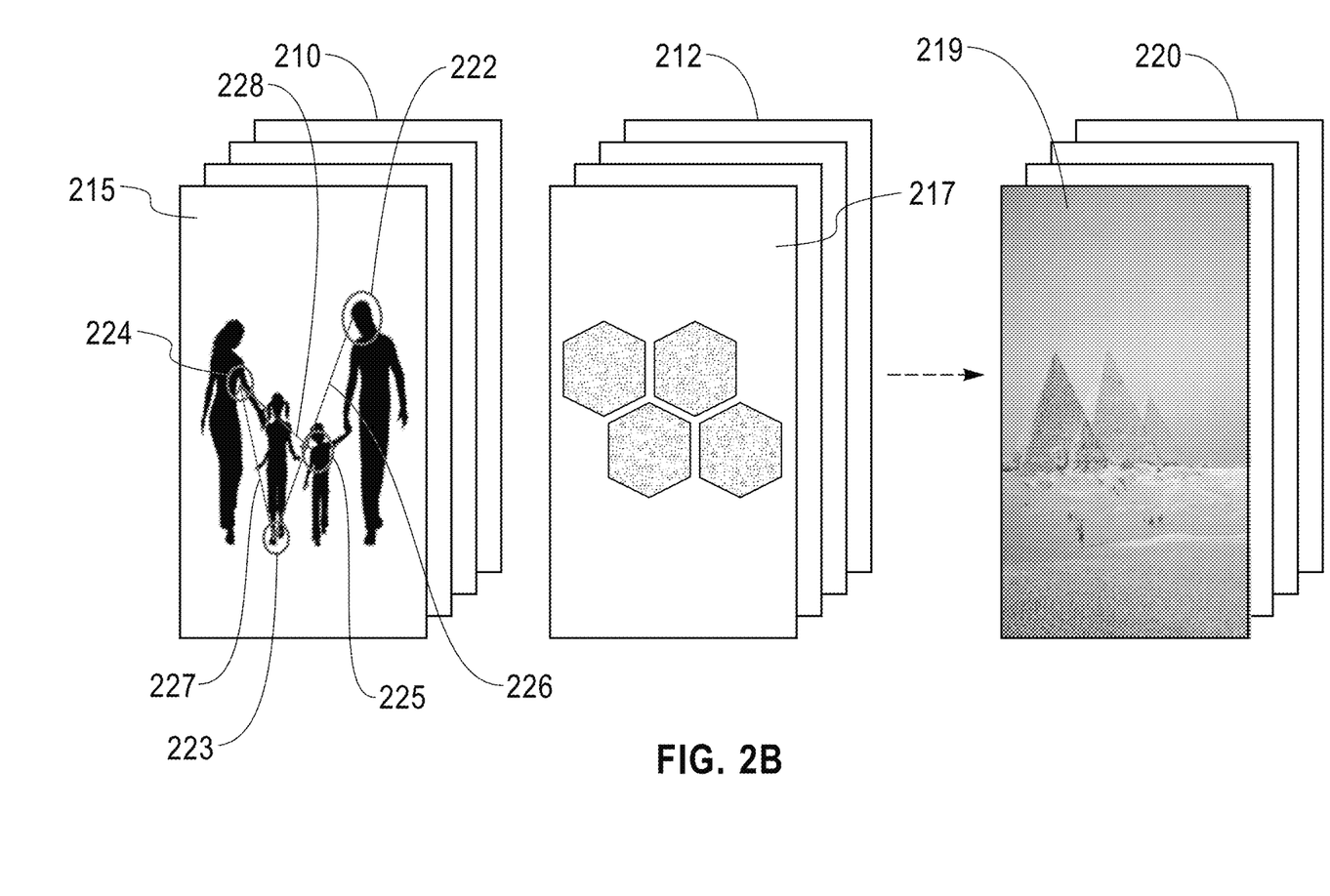
Figure 3A:
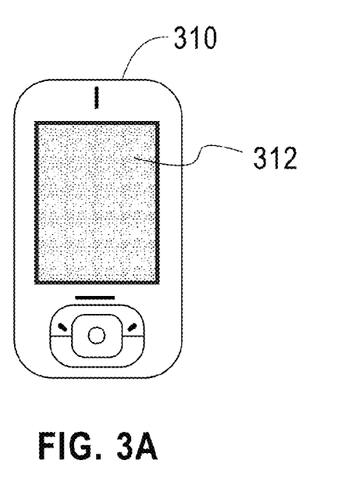
FIGS. 3A-3D show still exemplary implementations according to an embodiment of the present invention.
Figure 3B:
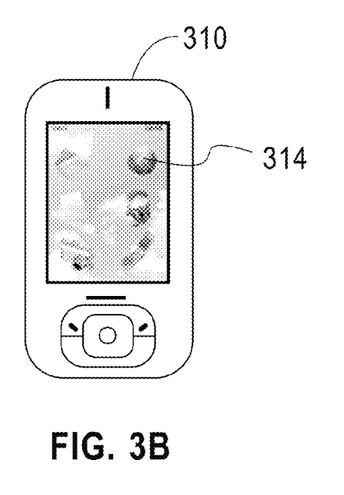
Figure 3C:
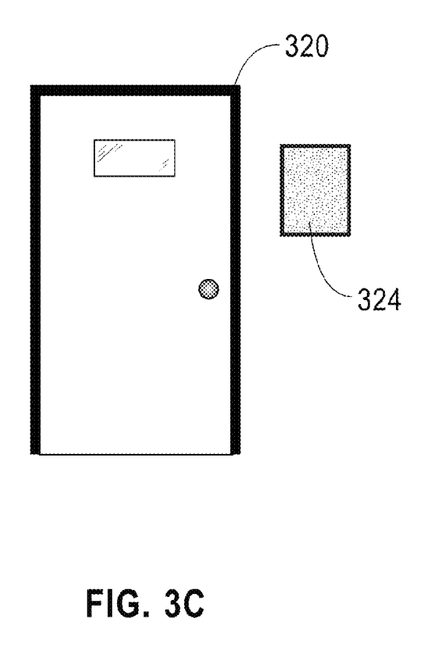
Figure 3D:
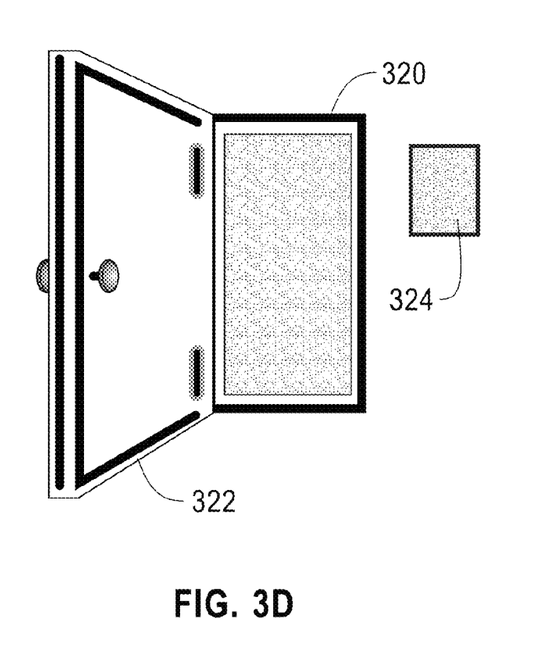

Referring to FIGS. 2A and 2B, an exemplary implementation according to an embodiment of the present invention is depicted. A plurality grouping of image classes (210, 212 and 220) contains sets of unique images. A first group image class 210 can be directed towards people images. Another group image class may be arranged of abstract objects 217. Still another group image class may be based on landscapes 219. When a password needs to be set for an image, a user first selects visual clues (222, 223, 224 and 225) on image 215 via a touch screen device (not shown). The user then inputs drawing gestures on the touch screen device by drawing a line (226, 227 and 228) connecting the selected visual clues (222, 223, 224 and 225). The ordered sequence of inputs also forms part of the password. The password may be in the following ordered sequence:

A) Choosing visual clues;
1—father head
2—daughter feet
3—mother left arm
4—son chest B) Tracing a path graphical path connecting the visual clues.

Another embodiment of the present invention may include generating a password using the following ordered sequence:

Let A be a visual clue;
Let S be a possible gesture (e.g. tap, circle, straight line, curved line);
Let A(i) with i=0 . . . n be the ordered set of selected visual clues;
Let S(j) with j=0 . . . n be the ordered set of selected gestures; where the password is an ordered sequence of "n" tuples (A(i), A(i+1), S(j)) each means "start from clue A(i) and go to clue A(i+1) using gesture S(j).

A valid password may be the reversed password (execute gestures in the reverse order) when the system challenges the user to reverse. A valid password may also be the two subsequences from k to n and from 0 to k when the system challenges the user to start from a specific visual clue. A valid password may further be a shorter sequence (e.g. start from clue 'x') if the system allows for a "faster" authentication—e.g. to unlock the screen when it was locked only few minutes ago.

Still another embodiment of the present invention may include generating a password using the following ordered sequence: Let Typ be an image class (e.g. family pictures, sea images, mountains, sky, etc.);

Let Img be an image;
Let Clu be a visual clue;
Let Ges be a possible gesture (e.g. tap, circle, straight line, curved line);
Let Typ(h) with h=0 . . . n0 be the set of possible image classes;
Let Img(i)(h) with i=0 . . . n1(h) be the set of images belonging to the class h;
Let Clu(j)(h) with j=0 . . . n2(h) be the set of possible visual clues belonging to the class h;
Let Ges(k) with k=0 . . . n3 be the set of possible gestures;
where the password becomes an ordered sequence of tuples (Typ(a), Img(b), Clu(c), Clu(d), Ges(e)) each means "on image Img(b)(a) start from Clu(c)(a) and go to Clu(d)(a) using gesture Ges(e)).

The password strength is dependent on the number of steps within the tuple sequence. Each step in the tuple sequence provides n0*n1*n2*n3 combinations. In a simple case with:

*Typ=4 ("family", "mountains", "fishing", "nature");
*Img=10 images for each category;
*Clu=8 clues for each category (e.g. family: "father head", "father legs", "son head", "son legs", "mother head", "mother legs", "daughter head", "daughter legs"); and
*Ges=4 (tap, circle, straight line, curved line).

Each password step encodes 1280 combinations. A single step is equivalent to 11 bits of security. Two steps are equivalent to 20 bits of security. Three steps are equivalent to 30 bits of security. Four steps are equivalent to 41 bits of security. Five steps are equivalent to 51 bits of security.

In still another embodiment of the present invention may include the use in an enterprise environment. The locked access point may include access to an intranet, secured files or areas. The locked access point may further include access to cloud environments, both under the control of an enterprise and not under the control of the enterprise.

Referring to FIGS. 3A-3D, yet another embodiment of the present invention includes access control to either a personal user device 310 or secured area 320. To keep personal user devices secured, a locked access point 312 prevents unauthorized users from accessing the user device. The locked access point 312 employs the ordered sequence password requirements of the present invention. Once the ordered sequence password is correctly entered, the user device 310 is unlocked 314. Access to secured areas 320 may use a touch screen 324 to receive the required ordered sequence password. The locked access point 320 employs the ordered sequence password requirements of the present invention. Once the ordered sequence password is correctly entered, the secured area 320 is unlocked 322.

Figure 4:
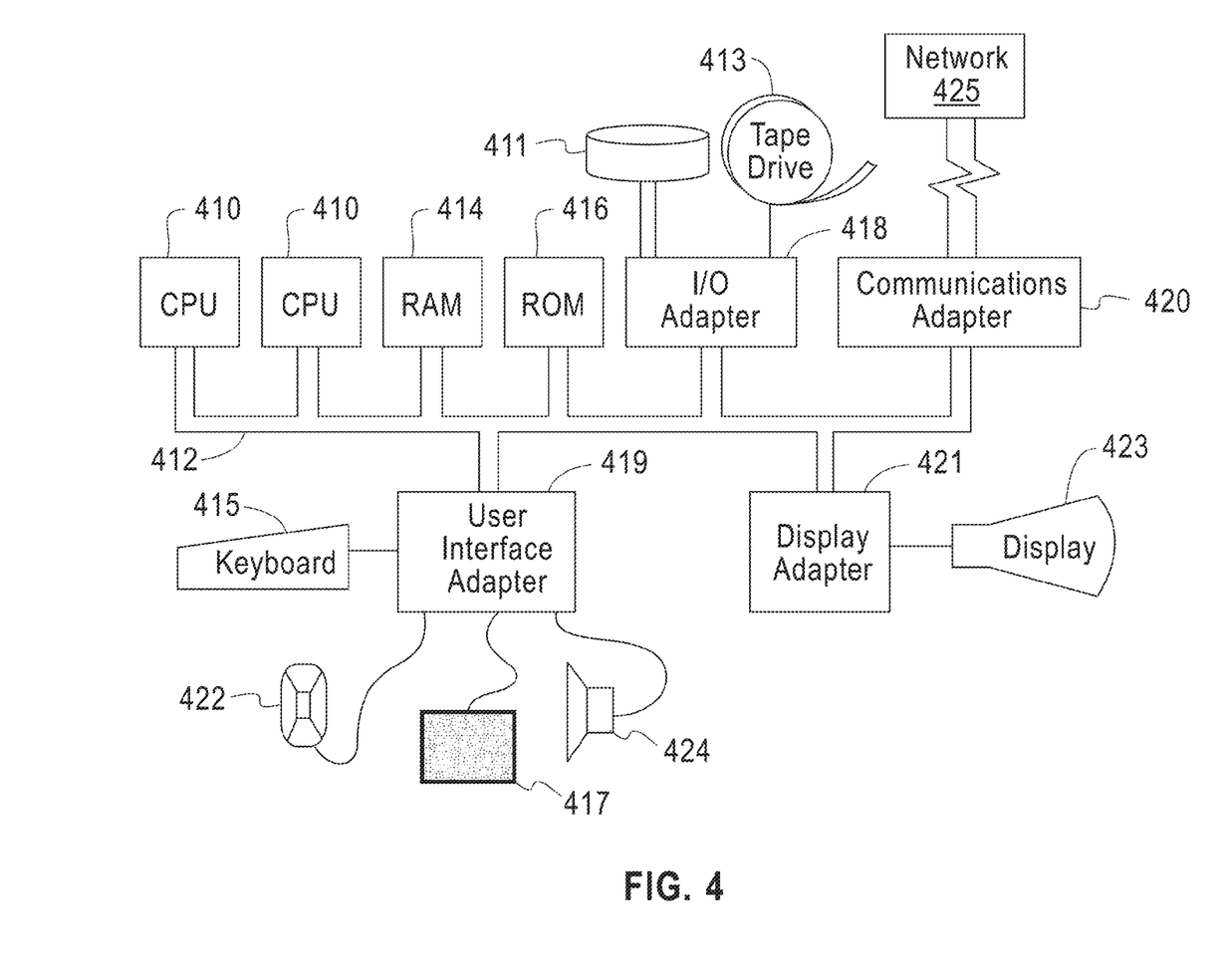
FIG. 4 illustrates a hardware configuration according to an embodiment of the present invention.

Referring now to FIG. 4, this schematic drawing illustrates a hardware configuration of an information handling/computer imaging system in accordance with the embodiments of the invention. The system comprises at least one processor or central processing unit (CPU) 410. The CPUs 410 are interconnected via system bus 412 to various devices such as a random access memory (RAM) 414, read-only memory (ROM) 416, and an input/output (I/O) adapter 418. The I/O adapter 418 can connect to peripheral devices, such as disk units 411 and tape drives 413, or other program storage devices that are readable by the system. The system can read the inventive instructions on the program storage devices and follow these instructions to execute the methodology of the embodiments of the invention. The system further includes a user interface adapter 419 that connects a keyboard 415, touch screen 417, speaker 424, microphone 422, and/or other user interface devices such as a touch screen device (not shown) to the bus 412 to gather user input. Additionally, a communication adapter 420 connects the bus 412 to a data processing network 425, and a display adapter 421 connects the bus 412 to a display device 423 which may be embodied as an output device such as a monitor, printer, or transmitter, for example.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving, by a computer device, a set of images for at least one user being provided by the at least one user;
   receiving, by the computer device, unique visual clue inputs from the at least one user for each image of the set of images;
   receiving, by the computer device, drawing gesture inputs from the at least one user for each image of the set of images; and
   using, by the computer device, the visual clue and drawing gesture inputs to create passwords to provide a locked access point for at least one device, wherein the created password is an ordered sequence of ($A_{(i)}$, $A_{(i+1)}$, $S_{(i)}$), where $A_{(i)}$ with i=0 . . . n is ordered set of selected initial visual clues, $A_{(i+1)}$ with i=0 . . . n is ordered set of selected subsequent visual clues and $S_{(i)}$ with j=0 . . . n is an ordered set of selected drawing gestures starting from $A_{(i)}$ and ending at $A_{(i+1)}$.

2. The method according to claim 1, wherein the set of images are grouped within an image class.

3. The method according to claim 2, further comprising the computer device randomly displaying one image from the set of images to the at least one user when the at least one device is to be unlocked.

4. The method according to claim 1, wherein the set of images are grouped with a plurality of image classes.

5. The method according to claim 1, wherein the created password is an ordered sequence of tuples.

6. The method according to claim 5, wherein the ordered sequence of tuples include a function of the set of image classes, at least one image from the set of images within the image classes, the received visual clue inputs and the received drawing gesture inputs.

7. A system comprising:
   one or more processors, one or more computer-readable memories and one or more computer-readable, tangible storage devices;
   a receiving module operatively coupled to at least one of the one or more storage devices for execution by at least one of the one or more processors via at least one of the one or more memories, configured to receive a set of images for at least one user being provided by the at least one user;
   the receiving module operatively coupled to at least one of the one or more storage devices for execution by at least one of the one or more processors via at least one of the one or more memories, configured to receive unique visual clue inputs from the at least one user for each image of the set of images;
   the receiving module operatively coupled to at least one of the one or more storage devices for execution by at least one of the one or more processors via at least one of the one or more memories, configured to receive drawing gesture inputs from the at least one user for each image of the set of images; and
   a security module operatively coupled to at least one of the one or more storage devices for execution by at least one of the one or more processors via at least one of the one or more memories, configured to use the visual clue and drawing gesture inputs to create passwords to provide a locked access point for at least one device, wherein the created password is an ordered sequence of ($A_{(i)}$, $A_{(i+1)}$, $S_{(i)}$), where $A_{(i)}$ with i=0 . . . n is ordered set of selected initial visual clues, $A_{(i+1)}$ with i=0 . . . n is ordered set of selected subsequent visual clues and $S_{(i)}$ with j=0 . . . n is an ordered set of selected drawing gestures starting from $A_{(i)}$ and ending at $A_{(i+1)}$.

8. The system according to claim 7, wherein the set of images are grouped within an image class.

9. The system according to claim 8, the further comprising the security module operatively coupled to at least one of the one or more storage devices for execution by at least one of the one or more processors via at least one of the one or more memories, configured to randomly display one image from the set of images to the at least one user when the at least one device is to be unlocked.

10. The system according to claim 7, wherein the set of images are grouped with a plurality of image classes.

11. The system according to claim 7, wherein the created password is an ordered sequence of tuples.

12. The system according to claim 11, wherein the ordered sequence of tuples include a function of using the set of image classes, using at least one image from the set of images within the image classes, using the received visual clue inputs and using the received drawing gesture inputs.

13. A computer program product comprising:
   one or more computer-readable, tangible storage medium;
   program instructions, stored on at least one of the one or more storage medium, to receive a set of images for at least one user being provided by the at least one user;
   program instructions, stored on at least one of the one or more storage medium, to receive unique visual clue inputs from the at least one user for each image of the set of images;
   program instructions, stored on at least one of the one or more storage medium, to receive drawing gesture inputs from the at least one user for each image of the set of images; and
   program instructions, stored on at least one of the one or more storage medium, to use the visual clue and drawing gesture inputs to create passwords to provide a locked access point for at least one device, wherein the created password is an ordered sequence of ($A_{(i)}$, $A_{(i+1)}$, $S_{(i)}$), where $A_{(i)}$ with i=0 . . . n is ordered set of selected initial visual clues, $A_{(i+1)}$ with i=0 . . . n is ordered set of selected subsequent visual clues and $S_{(i)}$ with j=0 . . . n is an ordered set of selected drawing gestures starting from $A_{(i)}$ and ending at $A_{(i+1)}$.

14. The computer program product according to claim 13, wherein the set of images are grouped within an image class.

15. The computer program product according to claim 14, further comprising program instructions, stored on at least one of the one or more storage medium, to randomly display one image from the set of images to the at least one user when the at least one device is to be unlocked.

16. The computer program product according to claim 13, wherein the created password is an ordered sequence of tuples.

17. The computer program product according to claim 16, wherein the ordered sequence of tuples include a function of using the set of image classes, using at least one image from the set of images within the image classes, using the received visual clue inputs and using the received drawing gesture inputs.

* * * * *